United States Patent [19]
Hatfield et al.

[11] Patent Number: 5,331,678
[45] Date of Patent: Jul. 19, 1994

[54] SPACER GRID ROD SUPPORT SYSTEM

[75] Inventors: Stephen C. Hatfield; Richard P. Broders, both of Granby, Conn.

[73] Assignee: Combustion Engineering, Inc., Windsor, Conn.

[21] Appl. No.: 54,189

[22] Filed: Apr. 27, 1993

[51] Int. Cl.⁵ .............................. G21C 3/34
[52] U.S. Cl. ........................................ 376/442
[58] Field of Search .............. 376/441, 442, 462, 463

[56] References Cited

U.S. PATENT DOCUMENTS

| | | | |
|---|---|---|---|
| 3,664,924 | 5/1972 | Krawiec | 376/442 |
| 4,028,180 | 6/1977 | Finch | 376/442 |
| 4,695,426 | 9/1987 | Nylund | 376/441 |
| 4,803,043 | 2/1989 | DeMario et al. | 376/442 |
| 4,879,090 | 11/1989 | Perrotti et al. | 376/442 |
| 5,024,426 | 6/1991 | Busch et al. | 376/441 |
| 5,114,668 | 5/1992 | Oyama et al. | 376/442 |
| 5,139,736 | 8/1992 | Bryan | 376/442 |
| 5,188,797 | 2/1993 | Bryan | 376/441 |

FOREIGN PATENT DOCUMENTS

| | | |
|---|---|---|
| 0304724 | 10/1988 | European Pat. Off. |
| 0317831 | 10/1988 | European Pat. Off. |
| 0332941 | 9/1989 | European Pat. Off. |
| 2642216 | 1/1990 | France |

*Primary Examiner*—Daniel D. Wasil
*Attorney, Agent, or Firm*—L. James Ristas; John H. Mulholland

[57] ABSTRACT

A grid strip (10) for a fuel rod support grid of a nuclear fuel assembly is cold-formed from a flat annealed plate having length, height, and width dimensions. A plurality of slots (12,14) extend along the height dimension at regular intervals along the length dimension, thereby defining successive cell walls (16,18,20) between successive slots along the length dimension. Each cell wall has upper, central, and lower regions (28,30,32) along the height dimension, each region including a substantially flat base area (34,36,38) and fuel rod support structure (22,24,26) projecting integrally from the base area along the width dimension of the strip. The support structure in each of the upper and lower regions includes a relatively stiff, arched stop (22,26) which projects in a first direction and the support structure in the central region includes a relatively soft, arched spring (24) which projects in a second direction opposite the first direction. The spring includes spaced apart pedestals 40,42 formed in the base area of the central region and projecting in the second direction, and a resilient beam 44 extending between and rigidly supported by the pedestals, so as to project in the second direction beyond the projection of the pedestals.

9 Claims, 2 Drawing Sheets

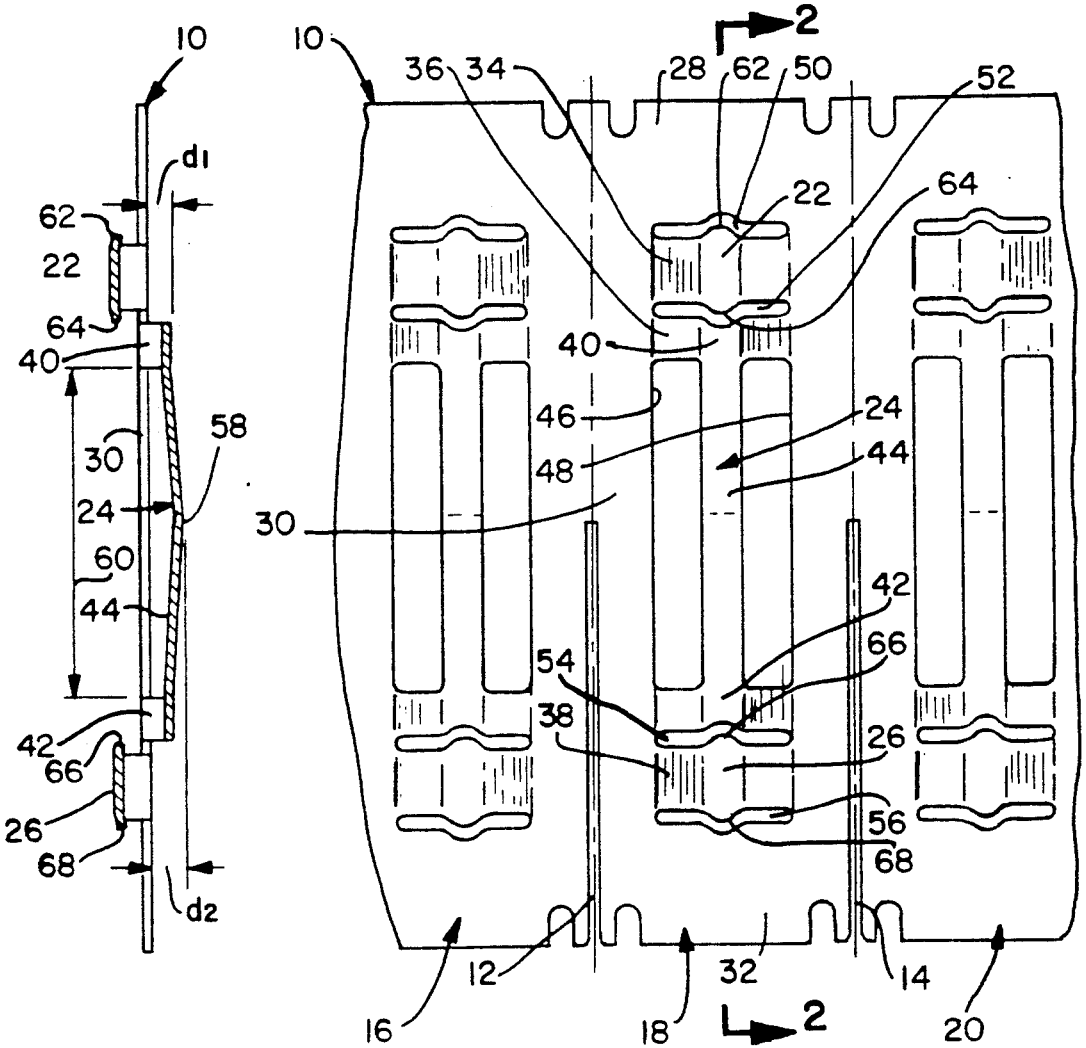

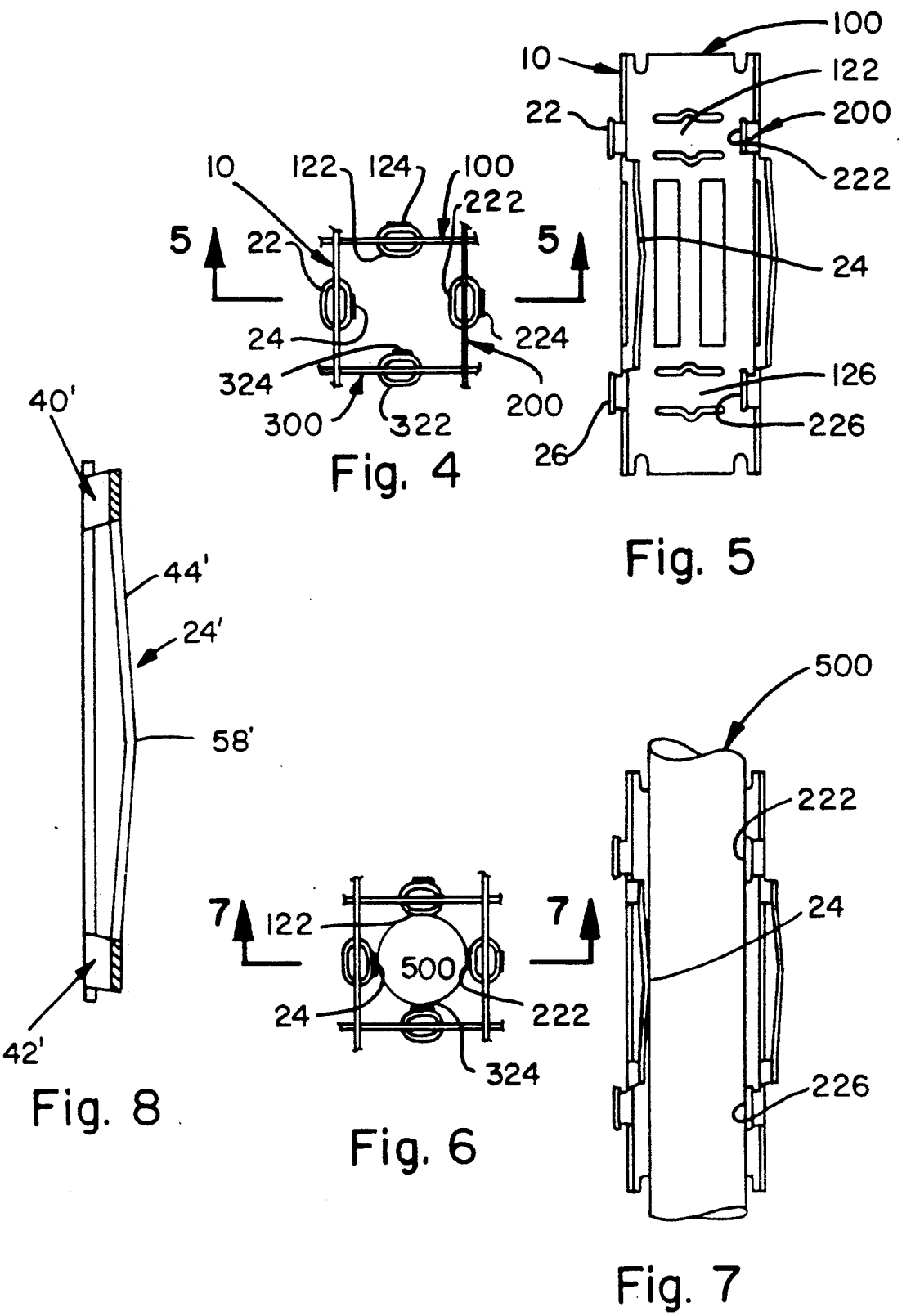

SPACER GRID ROD SUPPORT SYSTEM

BACKGROUND OF THE INVENTION

The present invention relates to nuclear fuel assemblies, and more particularly, to grid strips which form an egg crate type fuel rod support grid in a pressurized water nuclear fuel assembly.

Conventionally, pressurized water nuclear reactors have a core of nuclear fuel assemblies, in which the fuel rods are supported and spaced relative to each other, by spacer grids. Each cell of the grid utilizes a system of fuel rod support features including low stiffness springs and opposing high stiffness arches to contact, locate, and stabilize the fuel rod. At the time of fabrication of the fuel assembly, the geometry of each grid and associated cell is intended to provide lateral forces between the fuel rod and the support features. This type of fuel rod support is represented by U.S. Pat. Nos. 4,803,043, 4,879,090 and 5,188,797. Typically, the separation distance in the as built grid, between each spring and its opposing arches, is less than the outside diameter of a new fuel rod. Thus, when a rod is inserted into a grid cell, the spring is compressed and the rod is held between the support features with a preload force. Since these support or contact features project into the flow stream that passes through the cell during operation in the reactor, the rod support structure should present a low cross section to minimize pressure drop losses.

The effect of the reactor environment on the initial grid/rod interface is to cause the preload force to diminish through a combination of short-term and long-term mechanisms, followed by gap formation in cases where the force drops to zero. Short-term mechanisms include the effects of initial heatup of the fuel (partial relaxation of forming stresses in the grid strip and possible yielding of the grid strip due to reduced yield strength at higher temperatures) and initial pressurization of the reactor (spring compression is reduced because the fuel rod diameter decreases due to differential pressure). Long-term mechanisms include spring stress relaxation due to temperature and neutron flux, fuel rod cladding diametral creepdown, and, in the case of spacer grids made of Zircaloy, radiation growth of the grid cell.

Full scale flow tests have shown that inadequate rod support by the grid results in excessive rod vibration, leading to wear and possibly rod failure. These tests have shown that the key to limiting rod wear is the prevention of significant gaps between the grid contact features and the rod. Based on the mechanisms described above there are two general ways to minimize gaps. One can lessen the creepdown of the fuel rod cladding or improve the short-term and long-term responses of the grid features to reactor operating conditions. It is the latter approach which is used in the present invention.

SUMMARY OF THE INVENTION

It is, accordingly, an object of the present invention to improve the short-term and long-term response of the fuel rod support structures in the fuel assembly grid, by resisting the inherent tendency of the spring preload to decrease during reactor operation.

This is accomplished in the present invention, by stamping the grid strips to form beam springs such that each end of the beam spring is rigidly supported by a pedestal or the like which projects from the flat base region of the grid strip.

In particular, a grid strip in accordance with the present invention, comprises a substantially flat plate having length, height and width dimensions, and a plurality of slots extending along the height dimension at regular intervals along the length dimension, thereby defining successive cell walls between successive slots along the length dimension. Each cell wall has upper, central and lower regions along the height dimension, each region including a substantially flat base area and fuel rod support structure projecting integrally from the base area along the width dimension of the strip. The support structure in each of the upper and lower regions includes a relatively stiff, arched stop which projects in a first direction and the support structure in the central region includes a relatively soft, arched spring which projects in a second direction opposite the first direction. The spring includes spaced apart pedestals formed in the base area of the central region and projecting in the second direction, and a resilient beam extending between and rigidly supported by the pedestals, so as to project in the second direction beyond the projection of the pedestals.

Preferably, the pedestals project into each cell, a distance that puts them in close proximity to a fuel rod of the fabricated assembly. The crown of the beam spring projects slightly beyond the pedestal projection, in preload contact with the fuel rod.

Preferably, each pedestal forms an arch that curves along the length dimension of the strip and the beam forms an arch that curves along the height dimension of the strip. The arch stops are preferably formed between a pair of longitudinal cut-outs that extend along the length dimension of the strip. The beam is formed between a pair of transverse cut-outs that extend along the height dimension of the strip, and each pedestal is formed between one longitudinal cut-out and the pair of transverse cut-outs.

In a normal operating configuration in a nuclear reactor core, the length dimension of the strip would be horizontally oriented, the height dimension vertically oriented, and the width dimension oriented horizontally in a direction perpendicular to the length dimension.

The present invention provides a number of significant advantages over conventional springs. The horizontal pedestals at the base of the beam, limit the deflection of the beam to prevent damage by fuel rods that are excessively deflected during handling when the grid is fabricated or reconstituted. The flow blockage area of the spring is minimized, thus reducing the pressure drop associated with the spring. The shape of the beam spring against the fuel rod as loaded in the cell is almost flat, Especially in a fuel assembly grid in which the strips are made from a zirconium alloy material, e.g., Zircaloy, long-term exposure to radiation in the reactor core causes the material to elongate, with the amount of elongation directly related to the amount of straining (cold-working) the material experienced after annealing. Therefore, the elongated shape of the beam spring amplifies the differential growth between the base region of the strip and the beam spring, thereby minimizing or eliminating gap formation between the spring and the fuel rod despite prolonged core operation. Additional straining of the spring (overform, then force back) and creating a slight cant of the pedestal projections away from each other during the forming process of the spring, can further enhance the amplification effect.

BRIEF DESCRIPTION OF THE DRAWINGS

These and other objects and advantages of the invention will be described below with reference to the accompanying drawings, in which:

FIG. 1 is an elevation view of a portion of a strip for a nuclear fuel support grid in accordance with the present invention;

FIG. 2 is a section view of the grid strip of FIG. 1, taken along line 2—2;

FIG. 3 is a top view of the portion of the grid strip shown in FIG. 1;

FIG. 4 is a plan view of a portion of a nuclear fuel assembly grid cell which embodies the present invention;

FIG. 5 is a section view taken along line 5—5 of FIG. 4;

FIG. 6 is a view similar to FIG. 4, but with a fuel rod located in the cell;

FIG. 7 is a section view taken along line 7—7 of FIG. 6; and

FIG. 8 is a detailed elevation view of a second embodiment of the spring shown in FIG. 2.

DESCRIPTION OF THE PREFERRED EMBODIMENT

FIGS. 1-3 show a portion of a nuclear fuel assembly grid strip 10, which represents one of a plurality of orthogonally inter-engaged strips 10, 100, 200, 300 that would make up an egg-crate type fuel assembly grid with cells as shown in FIGS. 4-7 for supporting a plurality of nuclear fuel rods. Each strip 10 is initially sized and annealed as a substantially rectangular flat plate having length, height, and width dimensions. The plate is then stamped to form a plurality of cut outs, slots, and projections. The present invention is preferably implemented with strips 10, that are made from a zirconium alloy, especially Zircaloy.

Such a strip 10 has a plurality of slots 12,14 extending along the height dimension at regular intervals along the length dimension, thereby defining successive cell walls 16,18,20 between successive slots along the length dimension. A plurality of strips can thus be interengaged orthogonally at the slots to form the well-known egg-crate configuration. Each cell wall such as 16, has fuel rod support features or structure. In a preferred embodiment of the present invention, there are three fuel rod support features 22,24,26 per cell wall 16, located respectively in upper 28, central 30, and lower regions 32 of the cell wall. Each region includes a substantially flat base area 34,36,38, and cold-formed fuel rod support structure 22,24,26 projecting integrally from the base area along the width dimension of the strip. The support structure 22,26 in each of the upper 28 and lower regions 32 includes a relatively stiff, arched stop which projects in a first direction, and the support structure 24 in the central region includes a relatively soft, arched spring, which projects in a second direction opposite the first direction.

In accordance with the invention, the spring 24 includes spaced apart pedestals 40,42 or similar projections formed in the base area 36 of the central region 30 and projecting in the second direction. A resilient beam 44 extends between and is rigidly supported by the pedestals 40,42, so as to project in the second direction beyond the projection of the pedestals. Preferably, each pedestal forms an arch that curves along the length dimension of the strip, and the beam forms a shallow peak or arch that bends or curves along the height dimension of the strip.

The cut-outs 46,48 are formed adjacent to the locations of the pedestals 40,42 and beam 44. Moreover, additional cut-outs 50,52 and 54,56 are provided to facilitate the forming of the arches in the upper and lower regions, which project in a direction opposite to that of the spring. Preferably, each of the arch stops 22,26 is formed between a pair of longitudinal cut-outs 50,52 and 54,56 that extend along the length dimension of the strip. The beam 44 is formed between a pair of transverse cut-outs 46,48 that extend along the height dimension of the strip, and each pedestal such as 40 is formed between one longitudinal cut-out 52 and the pair of transverse cut-outs 46,48.

The pedestals 40,42 project from the central region base area 36 a first distance $d_1$, and the beam 44 has a crown 58 which projects from the central region base area a second distance $d_2$ which is less than twice the first distance. Preferably, the beam 44 has a length 60 extending between the pedestals 40,42, that is at least about ten times greater than the distance $d_3$ that the crown projects into the cell relative to the distance which the pedestal projects into the cell (i.e. $d_3 = d_2 - d_1$). In other words, the length 60 of the beam 44 is at least about ten times greater than the difference $d_3$ between the projection of the crown 44 relative to the base area 36 and the projection of the pedestals 40,42 relative to the base area 36.

All the fuel rod support features as described in connection with FIGS. 1-7, can be formed during a single stamping operation, which cold-works the material constituting the projections. The base regions 34,36,38 are in a condition corresponding to the annealing of the strip 10, before the cutting of the slots 12,14 and cut-outs 46,48,50,52,54,56. The projecting structure 22,24,26, however, necessarily experience a certain amount of straining (cold working) during formation. The more highly strained portions of the strip, undergo greater elongation and relaxation during exposure to radiation in the reactor core. It can be appreciated from inspection of FIGS. 1 and 2, that since beam 44 has been cold worked, whereas the base area 36 has not, the relatively greater elongation of the beam would give rise to axial compression stresses, acting inwardly toward the crown 58, which thereby urge the crown further into the cell.

The strips of the type shown in FIGS. 1-3, are assembled into an egg crate structure that results in the creation of grid cells with the geometry shown in FIGS. 4 and 5. Insertion of a fuel rod 500 into a grid cell produces the geometry shown in FIGS. 6 and 7. In the initial geometry of the cell as shown in FIGS. 4 and 5, the horizontal distance between each spring 24,324 and its opposing arch stops 222,226 and 122, 126 is less than the diameter of the fuel rod 500. Therefore, insertion of the fuel rod into the cell as shown in FIGS. 6 and 7, deflects each spring and thus preloads the rod against the arch stops. The preload prevents relative motion between the rod and grid during handling and shipment. During reactor operation the preload is reduced due to the short-term and long-term mechanisms described previously. Particularly with conventional Zircaloy grids, reactor operation can result in the complete loss of grid spring preload and the possible generation of gaps between the fuel rod and the rod support features.

However, the inventive configuration of the spring and its supports minimizes or eliminates these gaps by using the lateral amplification of the axial compression of a nearly straight beam.

As shown in FIG. 8, a more complex forming process of the spring 24' and its support projections 40'42' can further enhance the amplification effects between the beam and the base area. This is achieved by additionally straining only the spring 24 during or after the strip of FIGS. 1 and 2 has been stamped (overforming, then forcing back) and allowing a slight cant of the pedestals 40' 42' away from each other, i e , away from the crown 58' of the beam spring. The axial compression of the spring 24' can result from relaxation of the residual stresses associated with the cant of the support projections 40'42 or from the cold-worked spring being restrained from growing by the fully annealed strip. As with any virtually straight member, axial compression of the spring, however slight, results in a much larger lateral deflection. This lateral deflection of the spring is toward the rod, thus eliminating or minimizing any gap.

Another desirable feature which can be implemented with the present invention, is shown in FIGS. 1 and 2. The arch stops 22,26 in the first and second regions can be formed with vertical extensions 62,64 and 66,68 for contacting the rod and preventing scratching of the rod as it is inserted into the cell. The vertical contact length increases the rod-to-arch contact area, thus decreasing rod wear by lowering the contact pressure.

We claim:

1. A grid strip for a fuel rod support grid of a nuclear fuel assembly, comprising:
    a substantially flat plate of annealed zirconium alloy metal having length, height, and width dimensions;
    a plurality of slots extending along the height dimension at regular intervals along the length dimension, thereby defining successive cell walls between successive slots along the length dimension;
    each cell wall having a substantially flat base area and fuel rod support structure projecting integrally from the base area along the width dimension of the strip;
    wherein the support structure includes spaced apart pedestals cold-formed to project from the base area and a resilient beam cold-formed to project from the pedestals and to extend between and be rigidly supported by the pedestals, said pedestals having a maximum projection from the base area which defines a first distance and the beam having a crown with a maximum projection from the base area which defines a second distance that is less than twice the first distance; and
    wherein the beam has a length extending between the pedestals which is at least ten times greater than the difference between said second and first distances.

2. A grid strip for a fuel rod support grid of a nuclear fuel assembly, comprising:
    a substantially flat plate of annealed metal having length, height, and width dimensions;
    a plurality of slots extending along the height dimension at regular intervals along the length dimension, thereby defining successive cell walls between successive slots along the length dimension;
    each cell wall having a substantially flat base area and fuel rod support structure projecting integrally from the base area along the width dimension of the strip;
    wherein the support structure includes spaced apart pedestals cold-formed to project from the base area and a resilient beam cold-formed to project from the pedestals and to extend between and be rigidly supported by the pedestals, each pedestal forming an arch that bends along the length dimension of the strip with the pedestals being canted away from each other along the height dimension, and the beam forming an arch that bends along the height dimension of the strip.

3. A grid strip for a fuel rod support grid of nuclear fuel assembly, comprising:
    a substantially flat metal plate having length, height, and width dimensions;
    a plurality of slots extending along the height dimension at regular intervals along the length dimension, thereby defining successive cell walls between successive slots along the length dimension;
    each cell wall having upper, central, and lower regions along the height dimension, each region including a substantially flat base area and fuel rod support structure projecting integrally from the base area along the width dimension of the strip;
    wherein the support structure in each of the upper and lower regions includes a relatively stiff, arched stop which projects in a first direction and the support structure in the central region includes a relatively soft, arched spring which projects in a second direction opposite the first direction;
    said spring including spaced apart pedestals formed in the base area of the central region and projecting in the second direction, and a resilient beam extending between and rigidly supported by the pedestals, so as to project in the second direction beyond the projection of the pedestals, each pedestal forming an arch that bends along the length dimension of the strip and the beam forming an arch that bends along the height dimension of the strip.

4. The grid strip of claim 3, wherein
    each of the arch stops is formed between a pair of longitudinal cut-outs that extend along the length dimension of the strip,
    the beam is formed between a pair of transverse cut-outs that extend along the height dimension of the strip, and
    each pedestal is formed between one longitudinal cut-out and the pair of transverse cut-outs.

5. The grid strip of claim 4, wherein the pedestals are canted away from each other along the height dimension.

6. The grid strip of claim 3, wherein each arch stop includes a central portion that extends in the height dimension a distance greater than the height dimension of the arch at the base of the arch stop.

7. The grid strip of claim 3, wherein the strip is a zirconium alloy material.

8. The grid strip of claim 7, wherein the pedestals have a maximum projection from the central region base area which defines a first distance, and
    the beam has a crown with a maximum projection from the central region base area which defines a second distance which is less than twice the first distance.

9. The grid strip of claim 8, wherein
    the beam has a length extending between the pedestals, and
    the length of the beam is at least about ten times greater than the difference between said second and first distances.

* * * * *